United States Patent
Xing et al.

(10) Patent No.: US 11,287,523 B2
(45) Date of Patent: Mar. 29, 2022

(54) METHOD AND APPARATUS FOR ENHANCED CAMERA AND RADAR SENSOR FUSION

(71) Applicant: CMMB Vision USA Inc., Central Hong Kong (HK)

(72) Inventors: Guanbin Xing, Central Hong Kong (HK); Hui Liu, Central Hong Kong (HK); Jenq-Neng Hwang, Central Hong Kong (HK)

(73) Assignee: CMMB VISION USA INC., Central Hong Kong (HK)

( * ) Notice: Subject to any disclaimer, the term of this patent is extended or adjusted under 35 U.S.C. 154(b) by 0 days.

(21) Appl. No.: 16/207,438

(22) Filed: Dec. 3, 2018

(65) Prior Publication Data
US 2020/0174112 A1   Jun. 4, 2020

(51) Int. Cl.
*G01S 13/86* (2006.01)
*G01S 13/931* (2020.01)
(Continued)

(52) U.S. Cl.
CPC ............ *G01S 13/867* (2013.01); *G01S 7/003* (2013.01); *G01S 7/41* (2013.01); *G01S 13/931* (2013.01);
(Continued)

(58) Field of Classification Search
CPC .......... G01S 7/003; G01S 7/41; G01S 13/867; G05D 1/0088; G05D 1/0214; G05D 1/0246; G05D 1/0257; G05D 2201/0213
(Continued)

(56) References Cited

U.S. PATENT DOCUMENTS 9,632,502 B1 *  4/2017 Levinson ............... G06N 20/00
10,140,855 B1 * 11/2018 Swaminathan ...... G06K 9/6232
(Continued)

FOREIGN PATENT DOCUMENTS

WO   WO-2021042293 A1 *  3/2021   ............... G05D 1/02

OTHER PUBLICATIONS

Written Opinion of the International Searching Authority dated Mar. 20, 2020, in connection with corresponding International Application No. PCT/IB2019/001192 (4 pgs.).

*Primary Examiner* — Atul Trivedi
(74) *Attorney, Agent, or Firm* — Maier & Maier, PLLC

(57) ABSTRACT

A sensor fusion system for an autonomous vehicle and/or advanced driver assistance systems (ADAS) that combines measurements from multiple independent sensors to generate a better output. The multiple sensors can interact and perform "cross-training" for enhanced sensor performance. The sensor fusion system utilizes data exchange and cross-training between sensors for enhanced sensor performance while constantly improving sensor fusion results. Some exemplary embodiments of the present disclosure provide a system for an autonomous vehicle and/or a vehicle ADAS that combines information from independent sensors in order to accurately distinguish environmental objects and movements. This allows the vehicle to accurately make informed navigation decisions based on the environmental surroundings. The sensor fusion system can exchange ground truth information between the sensors related to a same object, which allows for constant machine learning object classification and constant speed/distance estimation calibration.

20 Claims, 2 Drawing Sheets

(51) Int. Cl.
   *G01S 7/41*   (2006.01)
   *G01S 7/00*   (2006.01)
   *G05D 1/00*   (2006.01)
   *G05D 1/02*   (2020.01)
(52) U.S. Cl.
   CPC ......... *G05D 1/0088* (2013.01); *G05D 1/0214* (2013.01); *G05D 1/0246* (2013.01); *G05D 1/0257* (2013.01); *G05D 2201/0213* (2013.01)
(58) Field of Classification Search
   USPC .......................................................... 701/23
   See application file for complete search history.

(56) References Cited

U.S. PATENT DOCUMENTS

| | | | | |
|---|---|---|---|---|
| 10,176,596 B1* | 1/2019 | Mou | ............ | G08G 1/16 |
| 10,338,594 B2* | 7/2019 | Long | ............ | G06K 9/00798 |
| 2013/0127980 A1* | 5/2013 | Haddick | ............ | G02B 27/0093 |
| | | | | 348/14.08 |
| 2017/0123428 A1* | 5/2017 | Levinson | ............ | G01S 7/497 |
| 2017/0132334 A1* | 5/2017 | Levinson | ............ | G06F 30/20 |
| 2017/0205506 A1 | 7/2017 | Voorheis et al. | | |
| 2018/0048801 A1* | 2/2018 | Kiser | ............ | H04N 5/2258 |
| 2018/0067490 A1* | 3/2018 | Pollach | ............ | G05D 1/0255 |
| 2018/0106885 A1* | 4/2018 | Blayvas | ............ | G01S 13/867 |
| 2018/0233047 A1* | 8/2018 | Mandeville-Clarke | ............ | |
| | | | | B60W 30/00 |
| 2018/0267558 A1* | 9/2018 | Tiwari | ............ | H04N 5/247 |
| 2018/0307238 A1* | 10/2018 | Wisniowski | ............ | G01S 17/86 |
| 2019/0011927 A1* | 1/2019 | Mou | ............ | G06K 9/00791 |
| 2019/0120955 A1* | 4/2019 | Zhong | ............ | G01S 13/584 |
| 2019/0156134 A1* | 5/2019 | Krishnan | ............ | A61B 5/225 |
| 2019/0156150 A1* | 5/2019 | Krishnan | ............ | A61B 3/113 |
| 2019/0301886 A1* | 10/2019 | Elangovan | ............ | G01C 21/3602 |
| 2019/0391235 A1* | 12/2019 | Harrison | ............ | G01S 13/726 |
| 2020/0007772 A1* | 1/2020 | Jung | ............ | H04N 5/23267 |
| 2020/0033868 A1* | 1/2020 | Palanisamy | ............ | B60W 40/09 |
| 2020/0064483 A1* | 2/2020 | Li | ............ | G01S 13/862 |
| 2020/0126179 A1* | 4/2020 | Yan | ............ | G06T 3/4038 |
| 2020/0142421 A1* | 5/2020 | Palanisamy | ............ | G06K 9/00791 |

* cited by examiner

METHOD AND APPARATUS FOR ENHANCED CAMERA AND RADAR SENSOR FUSION

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A self-driving or autonomous vehicle is a vehicle that is capable of sensing its environment and moving with little or no human input. Autonomous vehicles combine a variety of sensors to perceive their surroundings, such as radar, computer vision, camera, Lidar, sonar, GPS, odometry and inertial measurement units. Advanced control systems interpret sensory information to identify appropriate navigation paths, as well as obstacles and relevant signage.

Various types of advanced driver assistance systems (ADAS) have been developed for the convenience and safety of drivers. ADAS performs auxiliary controls with respect to acceleration and deceleration, steering, and the like of vehicles on the basis of information about a surrounding environment, such as a distance and a speed obtained by sensors. ADAS systems include, for example, a smart cruise control (SCC) system that automatically adjusts the vehicle speed to maintain a safe distance from vehicles ahead, a lane keeping assist system (LKAS) that helps keep a vehicle into its lane through control of steering, and a smart parking assist system (SPAS) that automatically recognizes and parks a vehicle.

Autonomous driving and ADAS demand reliable environmental sensing, and each of the many different sensors has its own merits and shortcomings. For example, cameras capture high quality images and are good at scenario interpretation (object detection and classification), but they do not perform as well for measuring distance and speed. Cameras can also be sensitive to lighting and weather conditions. On the other hand, radars are robust to all weather conditions and provide accurate distance and speed measurements, but they are usually limited in imaging resolution and lack classification capabilities (i.e., radars can detect objects but are unable to tell what the objects are). Thus, the strengths and weaknesses of cameras and radars are very complementary.

Sensor fusion is a common approach in autonomous driving systems in which the sensory data and measurements from disparate sources and/or multiple sensors are combined such that the resulting information has less uncertainty than would be possible when these sources were used individually. This provides for a more robust and accurate output. At the same time, each individual sensor technology is continuously making improvements for better sensor perception performance. An example of Lidar/radar sensor fusion in autonomous vehicle systems is provided by U.S. Pat. No. 9,097,800, incorporated by reference.

Radar is an object-detection system that uses radio waves to determine the range, angle, or velocity of objects. Existing methods try to combine radar spatial images with temporal information (e.g. micro-Doppler effects). For this purpose, the radar may have to output at a high frame rate.

Radar development has been evolving from basic detection and ranging functions to the more advanced perception requirements that allows for better target classification. There have also been recent advancements in machine learning based radar target classification, which not only relies on the objects' spatial image but also takes advantage of the objects' temporal characteristics (e.g. the torso/arms/legs movement pattern that generates the so-called micro-Doppler effects). However, to achieve suitable classification performance, it requires a great amount of training data, which requires sizable efforts to collect and label.

Progress has also been made on distance and speed quantification for cameras. However, most of the algorithms depend on the optical projection geometry and the measurements are sensitive to camera parameters (e.g. the lens angle/focus/etc.) and the reference scale, which can vary over time and environment. Without proper calibration, the accuracy is not guaranteed.

Traditionally in sensor fusion, each sensor operates independently and feeds measurements to the sensor fusion module, which combines all of the observations to generate an optimum output. There are no interactions among the sensors to improve the performance of each individual sensor.

SUMMARY

A sensor fusion system for an autonomous vehicle and/or advanced driver assistance systems (ADAS) is disclosed that combines measurements from multiple independent sensors to generate a better output. The multiple sensors can interact and perform "cross-training" for enhanced sensor performance. The sensor fusion system utilizes data exchange and cross-training between sensors for enhanced sensor performance while constantly improving sensor fusion results.

Some exemplary embodiments of the present disclosure provide a system for an autonomous vehicle and/or a vehicle ADAS that combines information from independent sensors in order to accurately distinguish environmental objects and movements. This allows the vehicle to accurately make informed navigation decisions based on the environmental surroundings. The sensor fusion system can exchange ground truth information between the sensors related to a same object, which allows for constant machine learning object classification and constant speed/distance estimation calibration.

Some exemplary embodiments of the present disclosure provide a non-transitory computer readable medium storing instructions that, when executed by one or more processors in a computing device, cause the computing device to perform operations that includes exchanging ground truth information between sensors associated with an autonomous vehicle and utilizing the ground truth information to train the sensors for object classification and distance/speed calibration.

Some exemplary embodiments of the present disclosure provide a sensor fusion system that combines information from a camera device and a radio detection and ranging (RADAR) device associated with a vehicle or an autonomous vehicle.

Because cameras are good at object detection and classification, the data obtained from the camera can be used as the "ground truth" to train the machine learning based radar classification, rather than relying on manual labeling. This can greatly improve the training efficiency.

Since radars can measure distance and speed with very high accuracy, the measurement results from radars can be used as the "ground truth" to calibrate the camera's distance and speed estimation algorithms. This operation will also reduce or eliminate human involvement and keep the distance/speed calibration consistently up to date.

In some exemplary embodiments of the present disclosure, the sensor cross-training is active and operating when the sensors are working under very good or optimal conditions. For example, a camera will work well during the day time and in good lighting, and radars perform well without the presence of electromagnetic interference. Under these conditions, the camera can accumulate a large amount of the most accurate and precise training data for radar calibration, and performance can continually improve with more training. In some exemplary embodiments, the camera/speed estimation can be constantly calibrated by radar and thus the sensors are able to always work at their most accurate.

In some exemplary embodiments of the present disclosure, one or more of the sensors can operate on their own, after training, to identify objects. For instance, if one sensor fails, another trained sensor can take over measurements or complement through sensor fusion techniques. In some exemplary embodiments, a trained RADAR sensor can operate without sensor input from a camera, for example, during night time or bad weather when a camera may not be working at its best. The well-trained RADAR sensor can then take over most or all of measurements. In other exemplary embodiments, when a RADAR sensor fails, for example due to interference, the well-trained and calibrated camera can still deliver accurate distance/speed measurements in place of the RADAR.

These and other features, advantages and objects of the disclosure will be further understood and appreciated to those of ordinary skill in the art by reference to the following description and drawings.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The present disclosure extends to systems, methods and computer program products for enhanced camera and radar sensor performance for autonomous driving that allows the autonomous vehicle to accurately make informed navigation decisions based on the environmental surroundings. The systems, methods and computer programs include interactions among the sensors and incorporate "cross-training" between the camera(s) and radar(s) for enhanced sensor performance.

Figure 1:
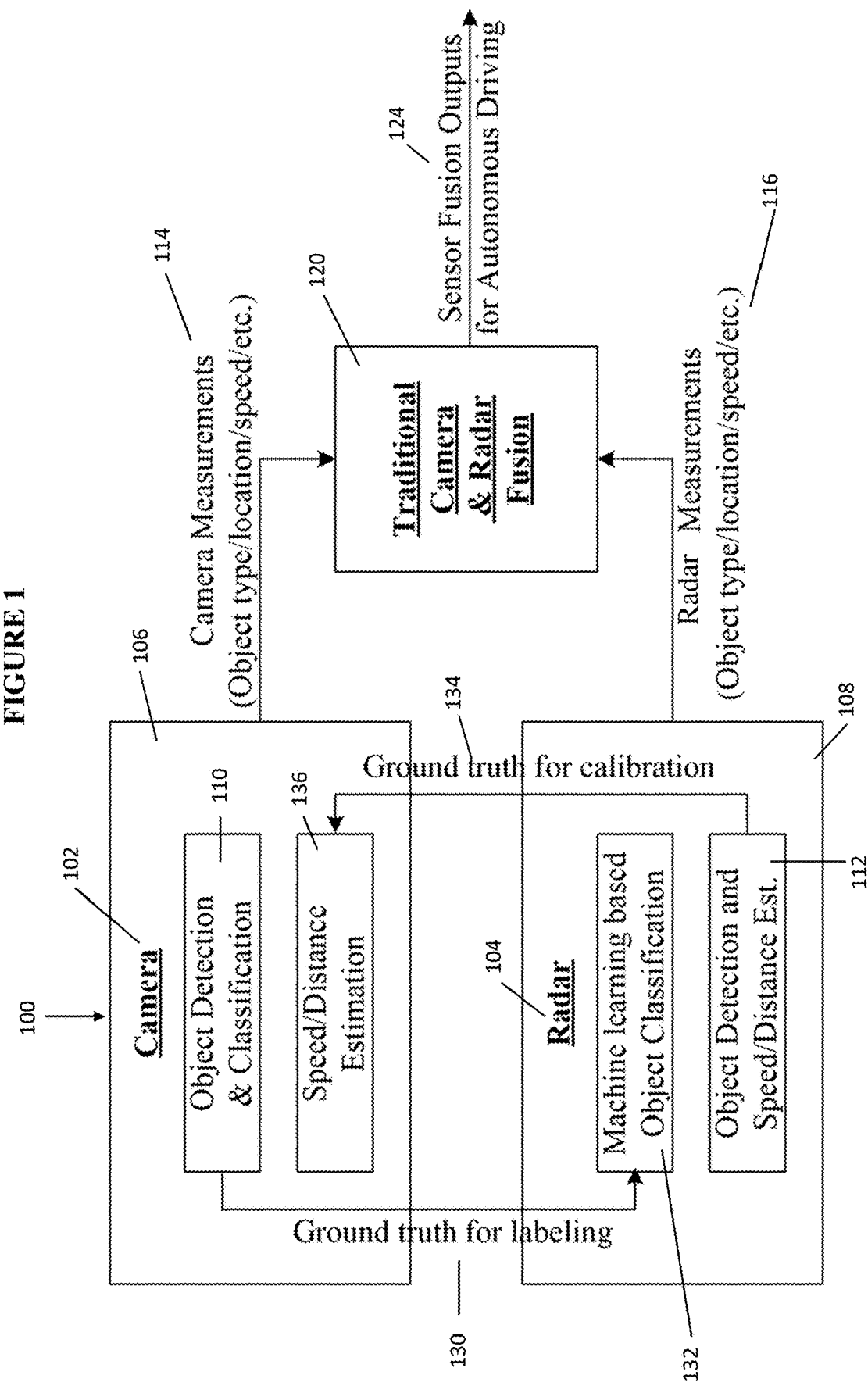
FIG. 1 is an exemplary block diagram of a sensor fusion system for autonomous vehicles that employs ground truth data exchange.

FIG. 1 illustrates an exemplary embodiment of the present system.

A sensor system 100 associated with an autonomous vehicle includes a camera 102 and a radar unit 104.

The camera 102 can be a photo-sensitive instrument that is configured to capture a number of images of the environment surrounding the vehicle. The camera 102 can be a still camera or a video camera and can be configured to detect visible light, and/or to detect light from other portions of the spectrum, such as infrared or ultraviolet light.

The camera 102 can be a two-dimensional detector, and/or can have a three-dimensional spatial range of sensitivity. In some embodiments, the camera 102 can use one or more range detecting techniques. For example, the camera 102 may include a range detector configured to generate a two-dimensional image indicating distance from the camera 102 to a number of points in the environment.

The camera 102 can use a narrow field-of-view (FOV) lens to facilitate longer distance object tracking capability, or a wider FOV lens to sense objects closer to the vehicle. The camera 102 can have associated optics that are operable to provide an adjustable field of view. Further, the camera 102 can be mounted to the vehicle and can be movable such as by rotating and/or tilting. The camera 102 can be mounted on a platform, and the camera and radar unit 104 can be installed on the same platform.

FIG. 1 shows a single camera 102, but the system can include a combination of more than one camera and the sensor data from each camera can be fused together into a view of the environment around the vehicle, as desired.

According to some embodiments, camera 102 can be included with a computer vision system 106 that can process and analyze images captured by camera 102 to detect and identify objects and/or features 110 in the environment surrounding the vehicle. The detected objects/features can include, for example, traffic signals, road way boundaries, other vehicles, pedestrians, bicyclists, obstacles, etc.

The computer vision system 106 can employ an object recognition algorithm, a Structure From Motion (SFM)

algorithm, video tracking, and/or other available computer vision techniques to effect identification and/or classification of the detected objects/features.

Radar unit 104 can represent a system that utilizes radio signals to sense objects within the local environment of the vehicle. Radar unit 104 can actively scan the surrounding environment for the presence of potential obstacles.

According to some embodiments, radar unit 104 can be included with a radar computer system 108 that can process and analyze radio signals captured by the radar unit 104 to detect objects 112. In some embodiments, in addition to sensing the objects, the radar unit 104 and/or computer system 108 can be configured to sense the objects' speed and/or distance 112.

The camera and radar sensor fusion system 120 utilizes an algorithm (or a computer program product storing an algorithm) configured to accept data from the sensor system 100 as an input. The data input includes camera measurement data 114 and radar measurement data 116. The sensor fusion system 120 algorithm can include, for example, a Kalman filter, Bayesian network, etc. The sensor fusion system 120 produces an output for driving the autonomous vehicle 124.

Because cameras are good at object detection and classification, the classification results of camera 102 and/or computer vision system 106 can be used as the ground truth 130 to train the machine learning based radar classification 132, rather than relying on manual labeling. This will greatly improve the training efficiency.

Since radars can measure distance and speed with much higher accuracy, the measurement results from radar 104 and/or radar computer system 108 can be used as the ground truth 134 to calibrate the camera's distance and speed estimation algorithms 136. This operation will also remove the human involvement and keep the calibration always up to date.

According to some embodiments, camera 102 and radar 104 cross-training can be turned on when both sensors are working under good conditions (e.g. cameras work well in day time and in good lighting; radars perform great without the presence of electromagnetic interference). The camera 102 can accumulate a great amount of ground truth 130 training data for radar classification 132, and thus, the performance can keep improving with more and more training. The camera speed/distance estimation 136 can also be constantly calibrated by radar ground truth 134 data and thus will be able to always work at optimal accuracy.

With the continual and/or constant training, both the radar's classification 132 capability and the camera's speed/distance estimation 136 accuracy can be always kept at their best. According to some embodiments, it is not necessary for the sensors to work concurrently. In the instance where one sensor fails, the other sensor's measurement can complement the missing data through the sensor fusion 120.

For example, during night time or bad weather when camera 100 does not work at its best, and therefore camera object detection and classification data 110, and camera measurement data 114 are not optimal, the well-trained radar's machine learning based object classification 132 can then kick in to assist in providing object type, location and speed data 116. Also, when radar 104 fails due to interference, the well-calibrated camera 102 can still deliver accurate object type, location and speed 114 measurements in place of the radar's object type, location and speed data 116.

Figure 2:
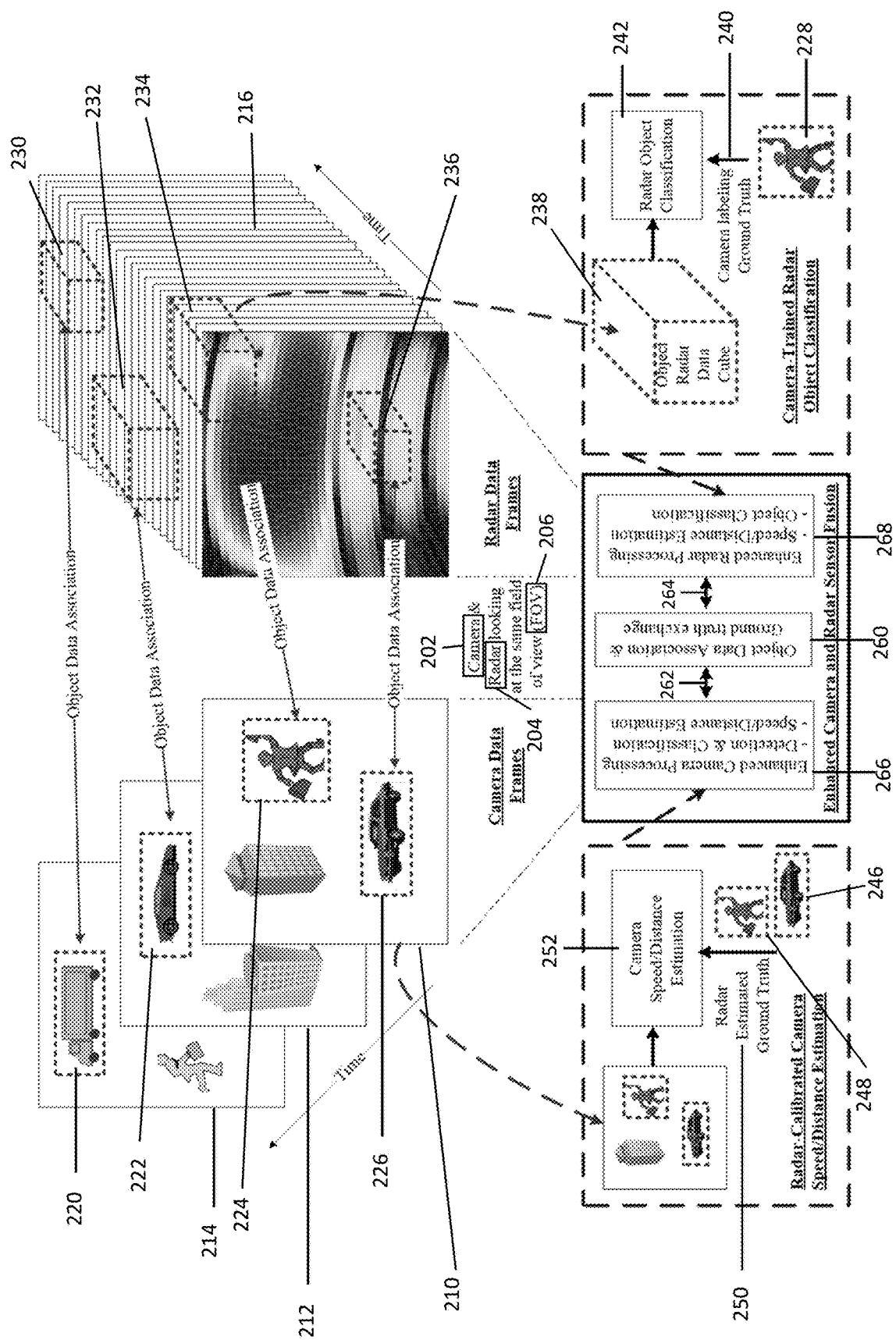
FIG. 2 is an exemplary schematic illustration showing the operation of the sensor fusion system according to an embodiment of the disclosure.

FIG. 2 illustrates another exemplary embodiment of the present system.

Camera 202 and radar unit 204 associated with an autonomous vehicle are installed and configured to be looking at the same scene with the same or overlapping field of view (FOV) 206.

Camera 202 generates a sequence of video data frames 210, 212, 214 of good image quality, on which traffic-related objects 220, 222, 224, 226 can be reliably detected, classified and tracked (e.g., pedestrians, bicyclists, vehicles, buildings, etc.). However, the distance and speed of these objects may not be estimated as accurately because the calculation is based on optical projection geometry and needs frequent calibration and adjustment.

Radar unit 204 performs multidimensional Fast Fourier Transformation (FFT) or other similar processing to transform the received radar echoes into a temporal sequence of radar spatial image frames 216. With this data, the objects can easily be detected with accurate distance and speed measurements. However, the radar generated spatial image 218 is of much lower resolution due to the physics constraints of radio waves, therefore making object classification very difficult (e.g. to determine whether a detected radar target is a pedestrian or a biker).

According to some embodiments, the radar spatial image frames 216 can be combined with temporal information (e.g. micro-Doppler effects) embedded in consecutive frames, and the classification is based on a radar data cube 230, 232, 234, 236.

A data association module/algorithm can be implemented to establish the correlation of camera detected objects 220, 222, 224, 226 to radar detected objects 230, 232, 234 236. For instance, as illustrated in FIG. 2, the algorithm can correlate the object classification results 228 from camera 202 with a radar data cube 238. Because camera 202 and radar unit 204 are looking at the same FOV 206, such correspondence can be readily achieved by aligning the radar 204/camera 202 coordinates, and synchronizing the data timing.

Once the data association is complete, the ground truth information 240 can be exchanged between the two sensors, i.e. camera 202 and radar unit 204, related to the same camera classified object 228. In this manner, the classification results 228 from camera 202 can be used as the ground truth labelling 240 to train the radar object classification 242. Also, the distance/speed measurements of radar detected objects 246, 248 can be used as the ground truth 250 to calibrate the camera 202 distance/speed estimation algorithms 252.

According to embodiments of the present system, the object data association and ground truth exchange 260 provides enhanced camera and radar sensor fusion. The data exchange and cross-training 262, 264 improves the perception performance of each individual sensor, thus providing enhanced camera processing, i.e. detection/classification and speed/distance estimation 266, and enhanced radar processing, i.e. speed/distance estimation and object classification 268.

According to embodiments, the cross-training 262, 264 can be continuously operational in real time, leading to constantly improving sensor function for autonomous driving.

According to some exemplary embodiments, the present system may include a storage unit for storing characteristic data of each of the sensors, and/or a processor for processing the sensor data. In some embodiments, the system can include cloud-based elements and components. For example, in some exemplary embodiments, the storage unit can include a cloud-based storage unit. In some exemplary embodiments, the processor can be a cloud-based processing unit. The cloud-based storage unit and/or processing unit can be configured to receive and store sensor data from the sensors, such as the object detection and classification data, the speed and distance data, and the cross-training data. This information can be stored in a database.

According to some embodiments, the cross-training data that is accumulated by the sensors can be stored in the cloud-based storage and/or processing unit. The cloud-based storage and/or processing unit can be configured and used to send the cross-training data to the autonomous vehicle. The cloud-based storage and/or processing unit can include a single server or cluster of servers. The connection between the cloud-based storage and/or processing unit and the autonomous vehicle can use any suitable communication medium, including wireless transport media, such as Wi-Fi, Bluetooth and RF. According to some embodiments, the cross-training data accumulated by one or more autonomous vehicle source can be collected and stored in the cloud. In this manner, the cross-training data can be continuously updated. According to some embodiments, the collected cross-training data from the one or more autonomous vehicle sources can be "aggregated", and the aggregated data used to further improve the machine based learning and performance of the individual sensors.

According to some embodiments, an autonomous vehicle can be equipped with or utilize only one sensor that is trained with the aggregated cross-training data stored in the cloud. For instance, in an exemplary embodiment, an autonomous vehicle is equipped with or utilizes only a radar sensor, but has the capability to learn object classification from the cross-training data stored on the cloud.

While certain aspects of the disclosure are particularly useful in connection with specific types of vehicle, the autonomous vehicle may be any type of vehicle, including, but not limited to cars, trucks, motorcycles, buses, boats, airplanes, helicopters, lawnmowers, earth movers, boats, Snowmobiles, aircraft, recreational vehicles, amusement park vehicles, farm equipment, construction equipment, trams, golf carts, trains, and trolleys.

It is to be understood that other embodiments may be utilized and structural or logical changes may be made without departing from the scope of the present disclosure. Therefore, the above detailed description is not to be taken in a limiting sense, and the scope of embodiments is defined by the appended claims and their equivalents.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method, comprising:
   providing a plurality of sensors including a first sensor and a second sensor associated with a vehicle, the first and second sensor configured to capture a scene of interest with a same or overlapping field of view (FOV);
   capturing a first set of data with the first sensor, and processing the first set of data to detect, classify and track traffic-related objects;
   capturing a second set of data with the second sensor, and processing the second set of data to detect classify and track traffic-related objects;
   identifying at least one condition affecting performance of at least one sensor in the plurality of sensors comprising at least one of an environmental condition or a sensor status condition, identifying the first sensor as having more optimal performance than the at least one sensor in the plurality of sensors based on the at least one condition, and accordingly selecting the first sensor as a training sensor;
   implementing a data association algorithm to correlate a first sensor detected object with a corresponding second sensor detected object;
   exchanging ground truth information between the first sensor and the second sensor related to a same detected object;
   utilizing at least one of the ground truth information from the first sensor to train the second sensor, and the ground truth information from the second sensor to train the first sensor.

2. The method of claim 1, wherein the first sensor is a camera and the first set of data comprises a sequence of video data frames.

3. The method of claim 1, wherein the second sensor is a radar and the second set of data comprises a sequence of radar image frames.

4. The method of claim 1, wherein:
   the first sensor is a camera and the first set of data comprises a sequence of video data frames;
   the second sensor is a radar and the second set of data comprises a sequence of radar image frames; and
   the ground truth information comprises at least one of object classification results from the camera and distance and speed measurements from the radar.

5. The method of claim 4, wherein at least one of the ground truth information from the camera is utilized to train the radar for object classification and the ground truth information from the radar is utilized to calibrate camera distance and speed estimation algorithms.

6. The method of claim 1, wherein the vehicle is an autonomous vehicle.

7. The method of claim 1, wherein the method affects an advanced driver assistance system (ADAS) associated with the vehicle.

8. A vehicle, comprising:
   a plurality of sensors, including:
   a first sensor configured to capture a first set of signals from traffic-related objects in a scene of interest; and
   a second sensor configured to capture a second set of signals from traffic-related objects in a scene of interest, wherein the scene of interest is a same or overlapping field of view (FOV); and
   a processor configured to:
   instruct the first sensor to capture the first set of signals, and process the first set of signals to detect, classify and track the traffic-related objects;
   instruct the second sensor to capture the second set of signals, and process the second set of signals to detect, classify and track the traffic-related objects;

identify at least one condition affecting performance of at least one sensor in the plurality of sensors comprising at least one of an environmental condition or a sensor status condition, identify the first sensor as having more optimal performance than the at least one sensor in the plurality of sensors based on the at least one condition, and accordingly select the first sensor as a training sensor;

implement a data association algorithm to correlate a first sensor detected object with a corresponding second sensor detected object;

exchange ground truth information between the first sensor and the second sensor related to a same detected object; and utilize at least one of the ground truth information from the first sensor to train the second sensor, and the ground truth information from the second sensor to train the first sensor.

9. The vehicle of claim 8, wherein the first sensor is a camera and the first set of signals comprises a sequence of video data frames.

10. The vehicle of claim 8, wherein the second sensor is a radar and the second set of signals comprises a sequence of radar image frames.

11. The vehicle of claim 8, wherein
the first sensor is a camera and the first set of signals comprises a sequence of video data frames;
the second sensor is a radar and the second set of signals comprises a sequence of radar image frames; and
the ground truth information comprises at least one of object classification results from the camera and distance and speed measurements from the radar.

12. The vehicle of claim 11, wherein at least one of the ground truth information from the camera is utilized to train the radar for object classification, and the ground truth information from the radar is utilized to calibrate camera distance and speed estimation algorithms.

13. The vehicle of claim 8, wherein the vehicle is an autonomous vehicle.

14. A non-transitory computer readable medium storing instructions that, when executed by one or more processors in a computing device, cause the computing device to perform operations, the operations comprising:
capturing a series of first signals detected by a first sensor among a plurality of sensors associated with a vehicle, and processing the series of first signals to detect, classify and track traffic-related objects;
capturing a series of second signals detected by a second sensor among a plurality of sensors associated with a vehicle, and processing the series of second signals to detect, classify and track traffic-related objects;
identifying at least one condition affecting performance of at least one sensor in the plurality of sensors comprising at least one of an environmental condition or a sensor status condition, identifying the first sensor as having more optimal performance than the at least one sensor in the plurality of sensors based on the at least one condition, and accordingly selecting the first sensor as a training sensor;
implementing a data association algorithm to correlate a first sensor detected object with a corresponding second sensor detected object;
exchanging ground truth information between the first sensor and the second sensor related to a same detected object; and
utilizing at least one of the ground truth information from the first sensor to train the second sensor and the ground truth information from the second sensor to train the first sensor.

15. The non-transitory computer readable medium of claim 14, wherein the first sensor is a camera and the series of first signals comprises a sequence of video data frames.

16. The non-transitory computer readable medium of claim 14, wherein the second sensor is a radar and the series of second signals comprises a sequence of radar image frames.

17. The non-transitory computer readable medium of claim 14, wherein:
the first sensor is a camera and the series of first signals comprises a sequence of video data frames;
the second sensor is a radar and the series of second signals comprises a sequence of radar image frames; and
the ground truth information comprises at least one of object classification results from the camera and distance and speed measurements from the radar.

18. The non-transitory computer readable medium of claim 17, wherein at least one of the ground truth information from the camera is utilized to train the radar for object classification and the ground truth information from the radar is utilized to calibrate camera distance and speed estimation algorithms.

19. The non-transitory computer readable medium of claim 14, wherein the vehicle is an autonomous vehicle.

20. The non-transitory computer readable medium of claim 14, wherein the operations affect an advanced driver assistance system (ADAS) associated with the vehicle.

* * * * *